(12) United States Patent
Yamaguchi et al.

(10) Patent No.: US 9,333,444 B2
(45) Date of Patent: May 10, 2016

(54) BUBBLE EXTINCTION MACHINE

(71) Applicant: YAMAGUCHI DOKEN KOGYO CO., LTD., Sorachi-gun, Hokkaido (JP)

(72) Inventors: Norifumi Yamaguchi, Sorachi-gun (JP); Morio Kasamatsu, Sapporo (JP)

(73) Assignee: YAMAGUCHI DOKEN KOGYO CO., LTD, Sorachi-Gun, Hokkaido (JP)

( * ) Notice: Subject to any disclaimer, the term of this patent is extended or adjusted under 35 U.S.C. 154(b) by 183 days.

(21) Appl. No.: 14/243,296

(22) Filed: Apr. 2, 2014

(65) Prior Publication Data
US 2015/0182880 A1 Jul. 2, 2015

(30) Foreign Application Priority Data
Dec. 31, 2013 (JP) ................................. 2013-273749

(51) Int. Cl.
*B01D 19/00* (2006.01)
*B01D 19/02* (2006.01)

(52) U.S. Cl.
CPC ............ *B01D 19/02* (2013.01); *B01D 19/0042* (2013.01)

(58) Field of Classification Search
CPC ............... B01D 19/00; B01D 19/0021; B01D 19/0026; B01D 19/0031; B01D 19/0042; B01D 19/0047; B01D 19/0052; B01D 19/0057; B01D 19/0063; B01D 19/0068; B01D 19/0073; B01D 19/0078; B01D 19/0084; B01D 19/0094; B01D 19/02
USPC ............................................ 96/177
See application file for complete search history.

(56) References Cited

U.S. PATENT DOCUMENTS 4,294,593 A * 10/1981 Rehm ................ B01D 19/0057
96/160

FOREIGN PATENT DOCUMENTS

JP 10-244101 A 9/1998
JP 2010-249418 A 11/2010

* cited by examiner

*Primary Examiner* — Thomas Bennett McKenzie
(74) *Attorney, Agent, or Firm* — Birch, Stewart, Kolasch & Birch, LLP

(57) ABSTRACT

A bubble extinction machine is provided for extinguishing bubbles in hot water stored in a hot water storage tank. The bubble extinction machine includes a hot water storage tank, a hot water introduction pipe for introducing hot water containing bubbles to the hot water storage tank, a discharge pressure adjusting device, a first vertical main pipe, a second vertical main pipe, a plurality of flow pipes, a hot water suction pipe, a first spiral drum, and a second spiral drum. Flow pipes are horizontally disposed between the first vertical main pipe and the second vertical main pipe, so that the hot water can pass through the flow pipes from the first vertical main pipe to the second vertical main pipe.

8 Claims, 3 Drawing Sheets

BUBBLE EXTINCTION MACHINE

BACKGROUND

1. Field of the Invention

The present invention relates to a bubble extinction machine for efficiently extinguishing bubbles generated in hot water stored in a hot water storage tank (a hot water tank) installed in various places such as hotels, hospitals, factories, hot bath facilities, aged care facilities, and other similar facilities that use a large amount of hot water.

2. Related Art

In heating devices, water heaters or the like, that use hot water as a medium, a hot water tank is required to store the hot water serving as a heat source. As an example of a device that stably and efficiently supplies the hot water to the hot water storage tank (hot water tank) storing the hot water, a heat source water supply system (JP 2010-249418 A, the content of which is herein incorporated by reference in its entirety) previously suggested by the inventors has been known.

Meanwhile, dissolved oxygen (bubbles) generated in a heating process is mixed with the hot water supplied from a hot water supply unit such as a boiler to such a heating device and a water heater.

When the bubbles are present in the hot water, the bubbles affect heat transfer to the hot water, and an irregularity state (unevenness of temperature) in which a high-temperature water portion and a low-temperature water portion are present together is formed.

That is, the bubbles have high temperature due to containing steam, the hot water heated in contact with the bubbles becomes a high-temperature water portion, whereas the hot water passed without touching the bubbles becomes a low-temperature water portion, and thus, a temperature difference occurs between both types of hot water. This is an uneven phenomenon of the hot water temperature, and there is a problem that the phenomenon also appears in the hot water tank.

BRIEF SUMMARY OF THE INVENTION

When the bubbles are present in the hot water storage tank, the bubbles stick together to generate bubble pools (also referred to as "air pools"), which adversely affects temperature stability of the hot water of high temperature. In particular, in the case of heating using the hot water as a medium, such an adverse effect significantly inhibits the heating effect, which leads to a situation in which a desired heating effect as temperature stability cannot be achieved.

Furthermore, the presence of the bubbles becomes a cause of occurrence of rust and also consequently leads to problems such as an occurrence of scaling and an occurrence of static electricity.

When attempting to ensure a desired heating temperature under such conditions, a set temperature of heating is unnecessarily increased, causing a vicious circle that further facilitates the occurrence of new bubbles accordingly.

Such a heating operation to the hot water cannot achieve an object of energy saving due to waste of heat resources, which leads to negative results such as an increase in $CO_2$.

A bubble extinction machine including the above-described JP 10-244101 A, the content of which is herein incorporated by reference in its entirety, does not aim at natural extinction of the bubbles in a state of absorbing the bubbles into the hot water inside the hot water storage tank, which is targeted by the present invention, and there is a problem that the effect of bubble extinction is not sufficiently obtained.

That is, in general, in the conventional bubble extinction machine, the bubbles generated in the heating process were physically isolated and discarded from the hot water with steam as a heat source during heating. In a brackish water separator, a direction of flow of hot water is changed (e.g., U-turn) and the steam and the bubbles are partially discharged to the outside. Accordingly, there has been a negative effect that the problem such as remnants of the bubbles still remain, the temperature stability of the supplied hot water is not consequentially ensured, and the heat resource of steam is wasted.

The present invention is to provide a bubble extinction machine adapted to solve all of the above-described problems by absorbing the bubbles present in the hot water in the hot water storage tank to be naturally extinguished.

According to a first aspect of the present invention, a bubble extinction machine in which a hot water introduction pipe for introducing hot water containing bubbles sent from a hot water supply unit into a hot water storage tank via a discharge pressure adjusting device is horizontally attached to a vicinity of an upper side wall of the hot water storage tank, the other side of the hot water introduction pipe is vertically bent downward inside the hot water storage tank to form a first vertical main pipe, a leading end of the first vertical main pipe extends to the vicinity of a lower portion of the hot water storage tank, a second vertical main pipe is provided in parallel on the side of the first vertical main pipe, a plurality of flow pipes (smaller in diameter than the diameter of the first vertical main pipe) is horizontally laid between the first vertical main pipe and the second vertical main pipe at predetermined intervals, a proximal end portion of each flow pipe is attached to the side wall of the first vertical main pipe so as to be open, a leading end portion of the flow pipe extends to the interior of the second vertical main pipe, the vicinity of the leading end portion is bent upward so as to be parallel to the second vertical main pipe, the leading end portion is formed in a nozzle body, a lower end of the second vertical main pipe is formed so as to be an opening, the upper other side of the second vertical main pipe is formed so as to be a horizontal extension pipe by being horizontally bent near the top of the hot water storage tank, a first spiral drum is attached to the vicinity of the middle of the horizontal extension pipe, a vertical extension pipe is formed by vertically bending the other side of the horizontal extension pipe so as to face the bottom of the hot water storage tank, a second spiral drum is attached to the vicinity of the middle of the vertical extension pipe, a last opening end of the vertical extension pipe is located near the center in the vertical direction of the hot water storage tank, a hot water suction pipe is erected at a center line position in the vertical direction of the hot water storage tank, a lower end opening of the hot water suction pipe is located near the bottom of the hot water storage tank, an upper end portion of the hot water suction pipe extends to the interior of the horizontal extension pipe, and an upper end opening of the hot water suction pipe is disposed by being bent so as to face a hot water flow direction of the horizontal extension pipe.

According to a second aspect of the present invention, in the bubble extinction machine of the first aspect, the discharge pressure adjusting device is provided with a main hot water circuit and a bypass hot water circuit, and a pressure switch capable of adjusting the discharge pressure of the hot water and a line pump are provided in the main hot water circuit.

According to a third aspect of the present invention, in the bubble extinction machine, a temperature sensor is provided on the side wall of the hot water storage tank.

According to a fourth aspect of the present invention, in the bubble extinction machine, an inspection hole is provided on the side wall of the hot water storage tank.

In the bubble extinction machine according to the first aspect of the present invention, as a result of adopting the above-described configuration, it is not necessary to physically isolate the bubbles from the hot water, and the isolated bubbles and the hot water are not discarded to the outside. Accordingly, there are excellent effects in which problems such as remnants of bubbles do not occur, the temperature stability of the hot water can be secured, and the heat resource of the steam is not wasted.

In addition, there are effects in which an object of energy saving can be achieved by elimination of the waste of the heat resource, and an increase in $CO_2$ can be prevented.

Furthermore, in the bubble extinction machine according to the second aspect, since the discharge pressure adjusting device is provided with the main hot water circuit and the bypass hot water circuit, and the pressure switch and the line pump capable of adjusting the discharge pressure of the hot water are provided in the main hot water circuit, there are effects in which the hot water containing the bubbles introduced into the hot water storage tank from the hot water introduction pipe can be secured at an optimal discharge pressure at all times, and the hot water supply to the hot water storage tank is stabilized. A preferred discharge pressure is 3 $kg/cm^2$ (±0.5 $kg/cm^2$) (e.g., 2.5 to 3.5 $kg/cm^2$).

In the bubble extinction machine according to the third aspect, since the temperature sensor is provided on the side wall of the hot water storage tank, there is an effect that the state of the hot water inside the hot water storage tank can be kept in an appropriate temperature state at all times. A preferable temperature is 60° C. (±5° C.) (e.g., 55 to 65° C.). In the bubble extinction machine according to the fourth aspect, since an inspection hole is provided on the side wall of the hot water storage tank, there is an effect that the state of the hot water inside the hot water storage tank can be kept in an appropriate state at all times.

Figure 1:
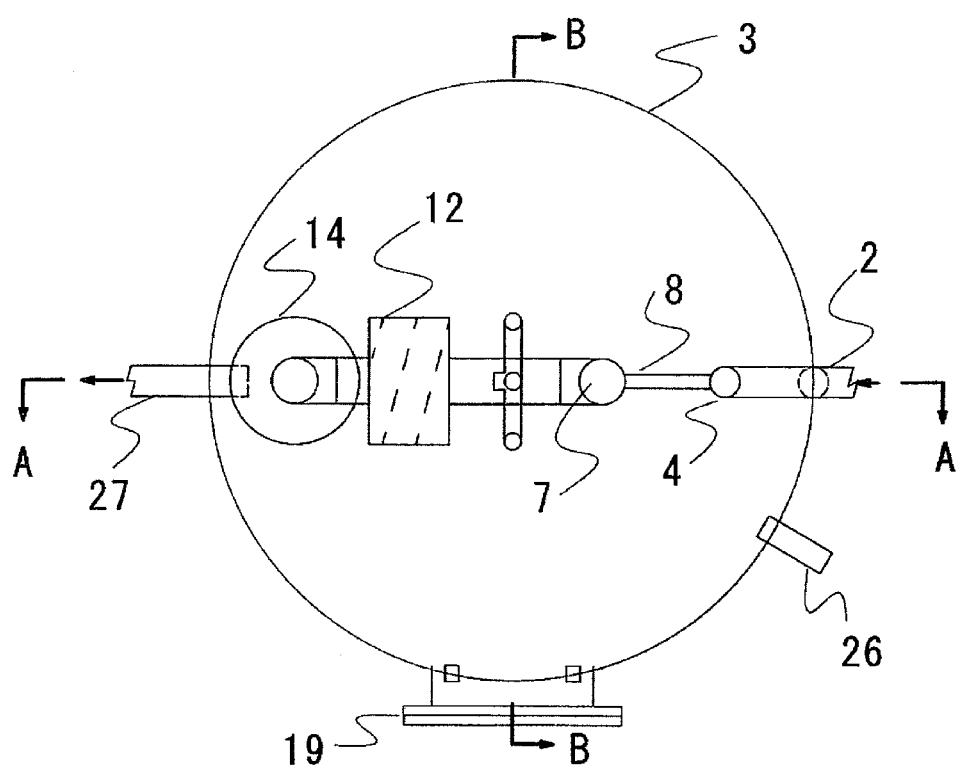
FIG. 1 is a plan view of a bubble extinction machine used in the present invention.

REFERENCE LIST 1 discharge pressure adjusting device
2 hot water introduction pipe
3 hot water storage tank
4 first vertical main pipe
5 leading end of first vertical main pipe
6 valve
7 second vertical main pipe
8 flow pipe
9 proximal end portion of suction pipe (attached to the first vertical maim pipe)
10 leading end portion of the suction pipe
11 horizontal extension pipe
12 first spiral drum
13 vertical extension pipe
14 second spiral drum
15 last opening end vertical extension pipe
16 hot water suction pipe
17 lower end opening of hot water suction pipe
18 upper end opening of hot water suction pipe
19 inspecting entrance of hot water storage tank
20 safety valve mounting opening of hot water storage tank
21 main hot water circuit
22 bypass hot water circuit
23 pressure switch
24 line pump
25 temperature sensor
26 inspection hole
27 hot water discharge pipe

DETAILED DESCRIPTION

Hereinafter, an embodiment of the bubble extinction machine of the present invention will be described with reference to the drawings, but the present invention is not limited to the embodiment.

Figure 2:
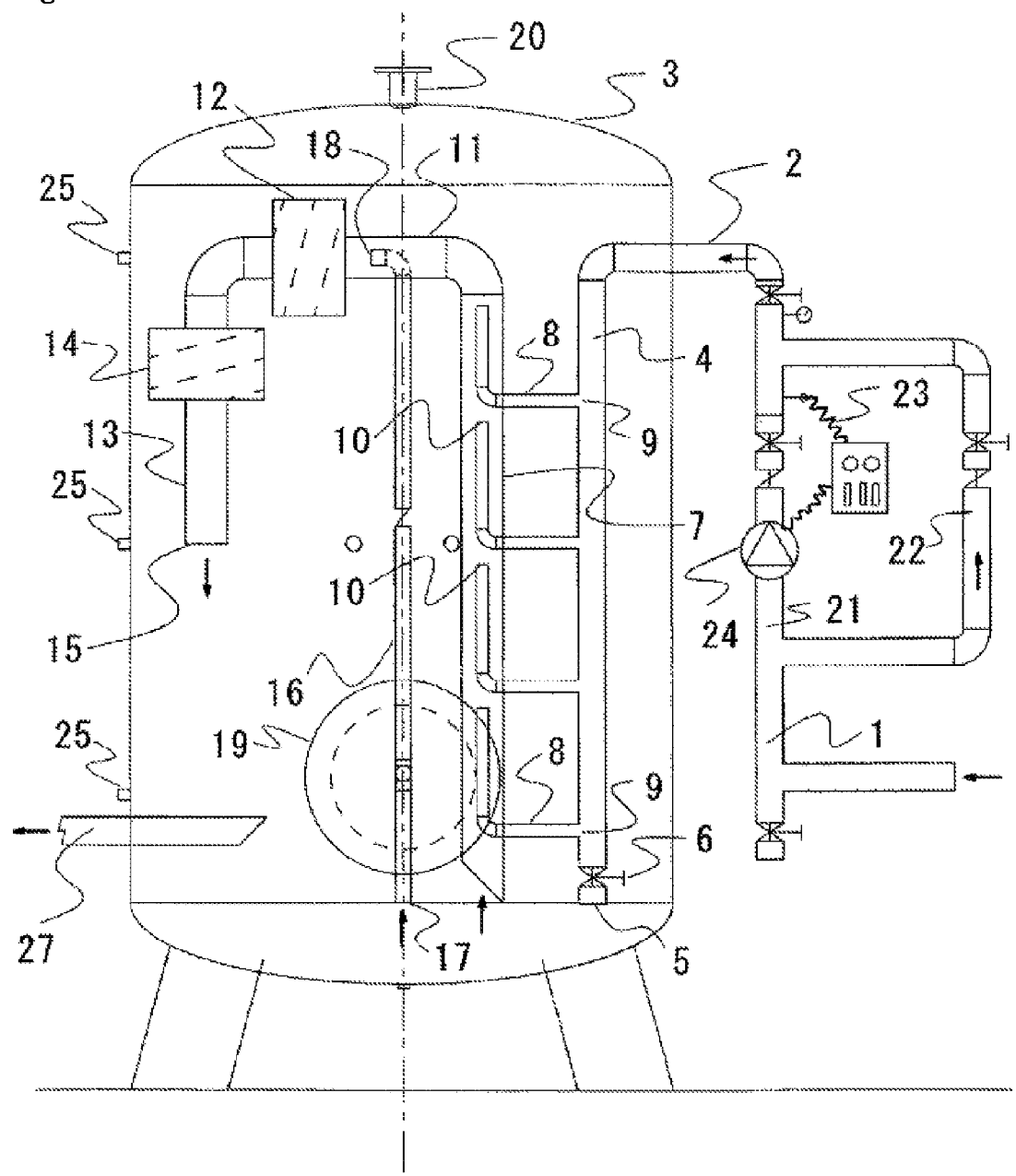
FIG. 2 is a cross-sectional view taken along a line A-A of FIG. 1.
Figure 3:
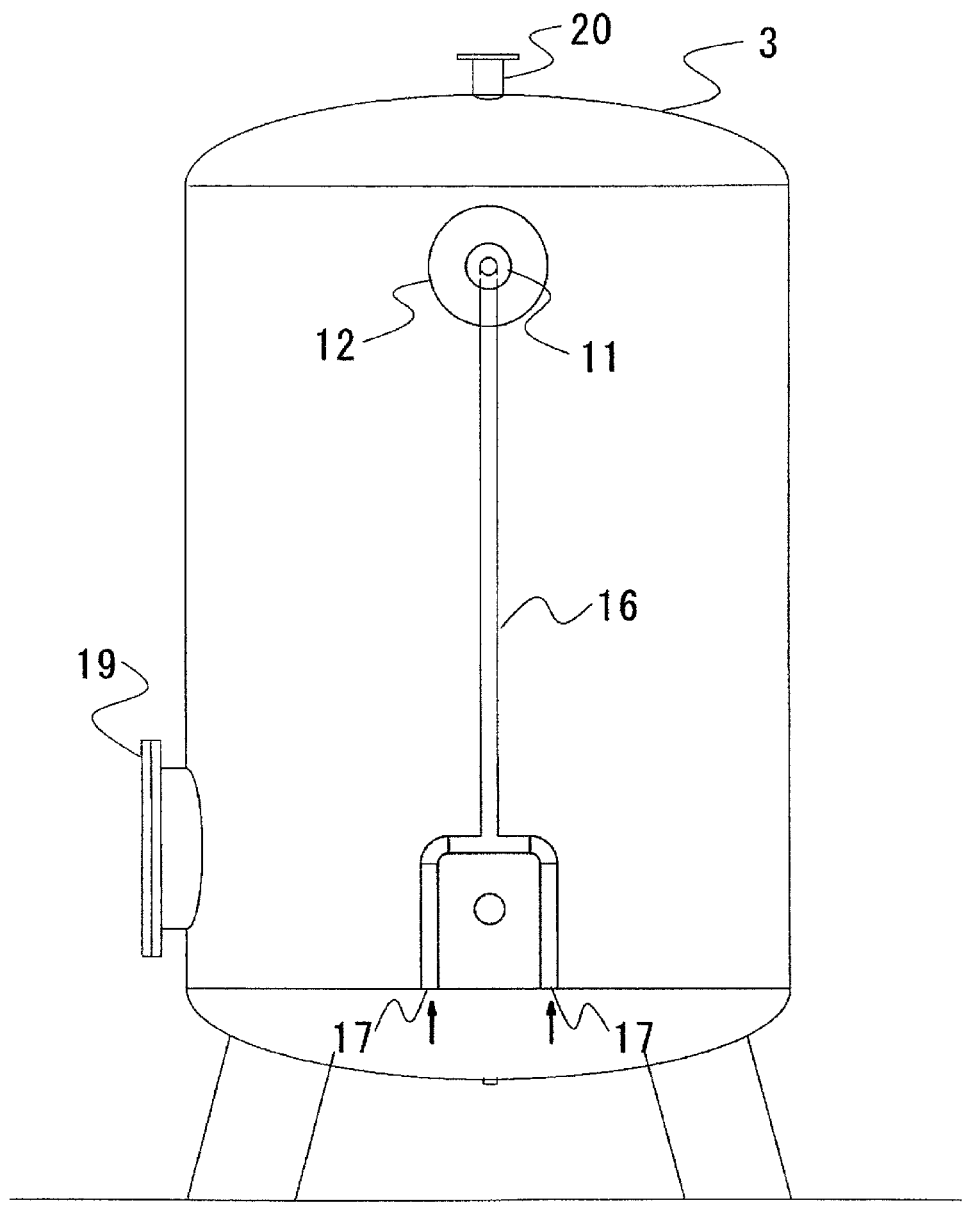
FIG. 3 is a cross-sectional view taken along a line B-B of FIG. 1.

FIG. 1 is a plan view of a bubble extinction machine used in the present invention, FIG. 2 is a cross-sectional view taken along a line A-A of FIG. 1, and FIG. 3 is a cross-sectional view taken along a line B-B of FIG. 1.

As illustrated in the drawings of the bubble extinction machine of FIGS. 1 to 3, hot water boiled at a predetermined temperature (approximately 60 to 95° C.) is supplied to a hot water storage tank 3 from a hot water introduction pipe 2 via a discharge pressure adjusting device 1, by a hot water supply unit (not illustrated) including a steam boiler, a heat exchanger or the like.

The hot water stored in the hot water storage tank 3 is eventually sent to various places that use a large amount of hot water, such as hotels, hospitals, factories, hot bath facilities, aged care facilities, and other similar facilities.

Since the bubbles (steam) are contained in the hot water, when the hot water is introduced into the hot water storage tank 3, it is necessary to extinguish the bubbles.

The other side of the hot water introduction pipe 2 horizontally attached to the vicinity of an upper side wall of the hot water storage tank 3 is vertically bent downward inside the hot water storage tank 3 to form a first vertical main pipe 4. A lower end 5 of the first vertical main pipe 4 extends to the vicinity of a lower portion of the hot water storage tank 3. The lower end 5 of the first vertical main pipe 4 is closed by a valve 6 at normal times. For example, the valve 6 can be opened for maintenance of the tank such as inspection of scale in the pipes and cleaning of the pipes.

On the side of the first vertical main pipe 4, a second vertical main pipe 7 is provided in parallel, and a plurality (four in the drawings) of flow pipes 8 is horizontally disposed between the first vertical main pipe 4 and the second vertical main pipe 7 at predetermined intervals. It is preferred that 3 to 4 flow pipes are disposed on the side of the first vertical main pipe 4 per 1 meter (m) of the vertical length of the first vertical main pipe 4.

A proximal end portion 9 of the flow pipe 8 is attached to the side wall of the first vertical main pipe 4 so as to be open, and a leading end portion 10 of the flow pipe 8 extends to the interior of the second vertical main pipe 7, and the vicinity of the leading end portion 10 is bent upward so as to be parallel to the second vertical main pipe 7. Furthermore, the leading end portion 10 is formed in a nozzle body.

A lower end of the second vertical main pipe 7 is formed so as to be an opening, and the upper other side of the second vertical main pipe 7 is formed in a horizontal extension pipe 11 by being horizontally bent near the top of the hot water storage tank 3.

A first spiral drum 12 is attached to the vicinity of the middle of the horizontal extension pipe 11.

Since the first spiral drum 12 is formed with a flow path through which the hot water can pass so as to draw a spiral within a cylindrical drum, even if a linear distance thereof is short, there are structural features in which the relatively long flow path of the hot water can be ensured.

The other side of the horizontal extension pipe 11 is bent vertically so as to face the bottom of the hot water storage tank 3, thereby forming a vertical extension pipe 13, and a second spiral drum 14 is disposed in a vicinity of the middle of the vertical extension pipe 13. The structure of the second spiral drum 14 can be the same as that of the first spiral drum 12, as described above.

A last opening end 15 of the vertical extension pipe 13 is located near the center in the vertical direction of the hot water storage tank 3.

A hot water suction pipe 16 is disposed at a approximately center line position in the vertical direction of the hot water storage tank 3, and a lower end opening 17 of the hot water suction pipe 16 is located near the bottom of the hot water storage tank 3. Meanwhile, the upper end portion of the hot water suction pipe 16 extends to the interior of the horizontal extension pipe 11, and an upper end opening 18 of the hot water suction pipe 16 is disposed by being bent so as to face the hot water flow direction of the horizontal extension pipe 11.

Note that in the drawings, reference numeral 19 is an inspecting entrance of the hot water storage tank, reference numeral 20 is a safety valve mounting hole of the hot water storage tank, and reference numeral 27 is a hot water discharge pipe of the hot water storage tank.

In the present invention according to the above configuration, hot water newly sent from the hot water introduction pipe 2 and the hot water remaining in the hot water storage tank are efficiently agitated and mixed in the hot water storage tank 3, the steam of the newly introduced hot water of the relatively high temperature is mixed with the existing hot water of the relatively low temperature in the hot water storage tank 3, and the mixed state is also performed over a long distance. Accordingly, tests have revealed that a uniform temperature of the hot water is obtained, both types of hot water are mixed with each other at a temperature that extinguishes the bubbles, and the bubbles naturally disappear so as to be absorbed by the hot water.

Furthermore, the discharge pressure adjusting device 1 includes a main hot water circuit 21 and a bypass hot water circuit 22, and a pressure switch 23 and a line pump 24 capable of adjusting the discharge pressure of the hot water are provided in the main hot water circuit 21. Thus, the discharge pressure of the newly introduced hot water can be suitably controlled.

The hot water discharged by the line pump 24 goes to the flow pipes 8 through the first vertical main pipe 4. Since the flow pipe 8 has a smaller diameter than the diameter of the first vertical main pipe 4, the pressure in the flow pipes 8 can be increased to be about twice as high as that of the pressure of the hot water immediately after discharged from the line pump 24, for example. Consequently, the pressured hot water coming out from the flow pipes 8 generates force which causes hot water at the bottom of the hot water storage tank 3 to go up through the second vertical main pipe 7 and the hot water suction pipe 16. Further, the hot water is discharged downwardly from the last opening end vertical extension pipe 15. Such movement of the hot water generates a circulation of the hot water in the hot water storage tank 3.

Furthermore, by providing the appropriate number of temperature sensors 25 and monitoring ports 26 on the side wall of the hot water storage tank 3, the temperature control of the hot water can be precisely performed in the hot water storage tank, and an occurrence of an abnormal situation or the like can be coped with by monitoring the interior of the hot water storage tank 3 by an inspecting hole 26.

According to the present invention, the bubble extinction machine can be used in the field of handling the hot water storage tank installed in various places, such as hotels, hospitals, factories, hot bath facilities, and aged care facilities that use a large amount of hot water.

The invention claimed is:

1. A bubble extinction machine comprising:
a hot water storage tank;
a hot water introduction pipe for introducing hot water containing bubbles to the hot water storage tank;
a discharge pressure adjusting device;
a first vertical main pipe;
a second vertical main pipe;
a plurality of flow pipes;
a hot water suction pipe;
a first spiral drum; and
a second spiral drum,
wherein an end of the hot water introduction pipe is connected to the discharge pressure adjusting device and horizontally disposed in a vicinity of an upper side wall of the hot water storage tank, so that hot water containing bubbles is introduced from a hot water supply unit into the hot water storage tank via the discharge pressure adjusting device,
another side of the hot water introduction pipe is vertically bent downward inside the hot water storage tank to be connected to a first vertical main pipe, and a lower end of the first vertical main pipe extends to the vicinity of a lower portion of the hot water storage tank,
the second vertical main pipe is disposed in parallel on the side of the first vertical main pipe,
each said flow pipe is horizontally disposed between the first vertical main pipe and the second vertical main pipe at predetermined intervals, a proximal end portion of each flow pipe is attached to the side wall of the first vertical main pipe so that the hot water can pass through the flow pipes from the first vertical main pipe to the second vertical main pipe,
a leading end portion of each said flow pipe extends to the inside of the second vertical main pipe, the vicinity of the leading end portion of each flow pipe is bent upward so as to be parallel to the second vertical main pipe, and the leading end portion has a nozzle body,
the second vertical main pipe has an opening at a lower end, and an upper side of the second vertical main pipe is horizontally bent to form a horizontal extension pipe near a top of the hot water storage tank,
the first spiral drum is disposed in a vicinity of the middle of the horizontal extension pipe, the horizontal extension pipe is bent to connect to a vertical extension pipe at another side of the horizontal extension pipe, and an opening of the vertical extension pipe faces to the bottom of the hot water storage tank,
the second spiral drum is disposed in a vicinity of the middle of the vertical extension pipe, wherein a last opening end of the vertical extension pipe is located in approximately the center in the vertical direction of the hot water storage tank, and
the hot water suction pipe is vertically disposed at an approximately center line position in the vertical direction of the hot water storage tank, a lower end opening of the hot water suction pipe is located near the bottom of the hot water storage tank, an upper end portion of the hot water suction pipe extends into the inside of the horizontal extension pipe, and the upper end of the hot water suction pipe is bent so that a upper end opening of the hot water suction pipe is disposed in accordance with a hot water flow direction of the horizontal extension pipe.

2. The bubble extinction machine of claim 1,
wherein the discharge pressure adjusting device comprises a main hot water circuit and a bypass hot water circuit,
wherein the main hot water circuit further comprises a pressure switch capable of adjusting a discharge pressure of the hot water and a line pump.

3. The bubble extinction machine of claim 1,
wherein a temperature sensor is provided on the side wall of the hot water storage tank.

4. The bubble extinction machine of claim 2,
wherein a temperature sensor is provided on the side wall of the hot water storage tank.

5. The bubble extinction machine of claim 1,
wherein an inspection hole is provided on the side wall of the hot water storage tank.

6. The bubble extinction machine of claim 2,
wherein an inspection hole is provided on the side wall of the hot water storage tank.

7. The bubble extinction machine of claim 3,
wherein an inspection hole is provided on the side wall of the hot water storage tank.

8. The bubble extinction machine of claim 4,
wherein an inspection hole is provided on the side wall of the hot water storage tank.

* * * * *